(12) United States Patent
Harms et al.

(10) Patent No.: US 10,604,228 B2
(45) Date of Patent: Mar. 31, 2020

(54) CARGO HANDLING SYSTEM

(71) Applicant: GOODRICH CORPORATION, Charlotte, NC (US)

(72) Inventors: Scott Harms, Ypsilanti, ND (US); Sanjay Bajekal, Simsbury, CT (US); Thomas Gietzold, Stratford upon Avon (GB)

(73) Assignee: GOODRICH CORPORATION, Charlotte, NC (US)

( * ) Notice: Subject to any disclaimer, the term of this patent is extended or adjusted under 35 U.S.C. 154(b) by 292 days.

(21) Appl. No.: 15/641,551

(22) Filed: Jul. 5, 2017

(65) Prior Publication Data
US 2019/0009881 A1 Jan. 10, 2019

(51) Int. Cl.
*B64C 1/20* (2006.01)
*B64D 9/00* (2006.01)

(52) U.S. Cl.
CPC .......... *B64C 1/20* (2013.01); *B64D 9/00* (2013.01); *B64D 2009/006* (2013.01); *B64D 2221/00* (2013.01)

(58) Field of Classification Search
CPC ........ B65G 13/02; B65G 13/04; B65G 13/06; B65G 13/065; B65G 13/07; B65G 13/071; B65G 13/073
USPC ........................................................ 198/788
See application file for complete search history.

(56) References Cited

U.S. PATENT DOCUMENTS

| | | | | |
|---|---|---|---|---|
| 4,766,547 A | * | 8/1988 | Modery | B61L 23/005 104/88.04 |
| 6,021,888 A | * | 2/2000 | Itoh | B65G 43/08 198/783 |
| 6,302,266 B1 | * | 10/2001 | DeFrancisco | B65G 43/08 198/781.06 |
| 7,298,248 B2 | * | 11/2007 | Finley | G01S 7/022 340/438 |
| 7,589,614 B2 | * | 9/2009 | Xydis | G01S 5/06 340/5.61 |
| 8,308,107 B2 | * | 11/2012 | Hettwer | B64D 9/00 244/118.1 |
| 8,816,830 B2 | * | 8/2014 | Lai | G05B 19/19 318/286 |
| 9,014,840 B2 | | 4/2015 | Scherenberger et al. | |
| 9,022,208 B2 | * | 5/2015 | Huber | B65G 43/00 198/781.05 |
| 9,511,860 B2 | | 12/2016 | Himmelmann | |
| 2005/0065861 A1 | * | 3/2005 | Bann | G06Q 10/08 705/28 |
| 2017/0015503 A1 | * | 1/2017 | Harms | B65G 13/075 |

* cited by examiner

*Primary Examiner* — William R Harp
(74) *Attorney, Agent, or Firm* — Snell & Wilmer LLP

(57) ABSTRACT

A cargo handling system includes a power drive unit (PDU) configured to transport cargo within an aircraft. The cargo handling system further includes a cargo control unit (CCU) configured to output control data for controlling operation of the PDU. The cargo handling system further includes a power control unit (PCU) coupled to the PDU and the CCU. The PCU is designed to receive alternating current (AC) electrical power from a power source, convert the AC electrical power into direct current (DC) electrical power, receive the control data from the CCU, generate an output signal including the DC electrical power and the control data, and transmit the output signal to the PDU.

18 Claims, 5 Drawing Sheets

CARGO HANDLING SYSTEM

FIELD

The present disclosure is directed to a cargo handling system for use in an aircraft and, more particularly, to a cargo handling system that utilizes a cargo control unit and a power control unit to provide power to and control multiple power drive units.

BACKGROUND

Cargo handling systems may include multiple power drive units (PDUs) that transport cargo within a cargo bay of an aircraft. Each of these PDUs may receive a control signal and an alternating current (AC) power signal separately. Due to the cargo handling system architecture and the quantity of signals received by each PDU, a connector designed to transmit the signals to the PDU may be relatively large. Similarly, each PDU may include internal components for converting the AC power signal into a direct current (DC) power signal and for filtering the DC power signal.

SUMMARY

Described herein is a cargo handling system. The cargo handling system includes a power drive unit (PDU) configured to transport cargo within an aircraft. The cargo handling system further includes a cargo control unit (CCU) configured to output control data for controlling operation of the PDU. The cargo handling system further includes a power control unit (PCU) coupled to the PDU and the CCU. The PCU is designed to receive alternating current (AC) electrical power from a power source, convert the AC electrical power into direct current (DC) electrical power, receive the control data from the CCU, generate an output signal including the DC electrical power and the control data, and transmit the output signal to the PDU.

In any of the foregoing embodiments, the PDU includes multiple PDUs each configured to receive one of a plurality of output signals from the PCU.

In any of the foregoing embodiments, the PDU has a cogging torque and is configured to resist relative movement of cargo when the PDU fails to receive the DC electrical power.

In any of the foregoing embodiments, the output signal includes the DC electrical power and the control data on a same power line.

Any of the foregoing embodiments may also include a connector coupled to the PCU and the PDU and having a first contact configured to transport the output signal, a second contact coupled to a DC return, and at least a third contact coupled to a ground structure.

In any of the foregoing embodiments, the same power line functions as a data bus.

In any of the foregoing embodiments, the PCU is further configured to be allocated requirements to consume current that conforms to various aircraft standards.

In any of the foregoing embodiments, the CCU includes a wireless interface configured to establish a connection with a remote device only after authentication of the remote device that includes verifying that the remote device is located within a predetermined distance of the CCU.

In any of the foregoing embodiments, the CCU is further configured to verify that the remote device is located within the predetermined distance of the CCU by at least one of establishing a near field communication (NFC) link with the remote device or receiving a current location of the remote device from the remote device.

In any of the foregoing embodiments, the CCU is further configured to terminate the connection with the remote device after expiration of a predetermined amount of time without receiving a communication signal from the remote device.

In any of the foregoing embodiments, the PDU includes a radio frequency identification (RFID) reader and is configured to determine a location of the PDU by reading an RFID tag.

Also disclosed is a cargo handling system. The cargo handling system includes a plurality of power drive units (PDUs) each configured to transport cargo within an aircraft and having a cogging torque such that each of the plurality of PDUs resists relative movement of cargo when a respective PDU fails to receive power. The cargo handling system also includes a cargo control unit (CCU) configured to output control data for controlling operation of each of the plurality of PDUs. The cargo handling system also includes a power control unit (PCU) coupled to the plurality of PDUs and the CCU. The PCU is designed to receive alternating current (AC) electrical power from a power source, convert the AC electrical power into direct current (DC) electrical power, receive the control data from the CCU, generate an output signal including the DC electrical power and the control data, and transmit the output signal to each of the plurality of PDUs.

Any of the foregoing embodiments may also include a connector coupled to the PCU and at least one of the plurality of PDUs and having a first contact configured to transport the output signal, a second contact coupled to a DC return, and at least a third contact coupled to a ground structure.

In any of the foregoing embodiments, the PCU is further configured to filter the DC electrical power to reduce noise of the DC electrical power.

In any of the foregoing embodiments, the CCU includes a wireless interface configured to establish a connection with a remote device only after authentication of the remote device that includes verifying that the remote device is located within a predetermined distance of the CCU.

In any of the foregoing embodiments, the CCU is further configured to verify that the remote device is located within the predetermined distance of the CCU by at least one of establishing a near field communication (NFC) link with the remote device or receiving a current location of the remote device from the remote device.

In any of the foregoing embodiments, the CCU is further configured to terminate the connection with the remote device after expiration of a predetermined amount of time without receiving a communication signal from the remote device.

Also disclosed is a cargo handling system. The cargo handling system includes a power drive unit (PDU) configured to transport cargo within an aircraft and having a cogging torque such that the PDU resists relative movement of cargo when the PDU fails to receive power. The cargo handling system also includes a cargo control unit (CCU) that includes a wireless interface and is configured to output control data for controlling operation of the PDU and to establish a connection with a remote device only after authentication of the remote device that includes verifying that the remote device is located within a predetermined distance of the CCU. The cargo handling system also includes a power control unit (PCU) coupled to the PDU and the CCU. The PCU is designed to receive alternating current (AC) electrical power from a power source, convert the AC electrical power into direct current (DC) electrical power, receive the control data from the CCU, generate an output signal including the DC electrical power and the control data, and transmit the output signal to the PDU.

In any of the foregoing embodiments, the CCU is further configured to verify that the remote device is located within the predetermined distance of the CCU by at least one of establishing a near field communication (NFC) link with the remote device or receiving a current location of the remote device from the remote device.

Any of the foregoing embodiments may also include a connector coupled to the PCU and the PDU and having a first contact configured to transport the output signal, a second contact coupled to a DC return, and at least a third contact coupled to a ground structure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the disclosure, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
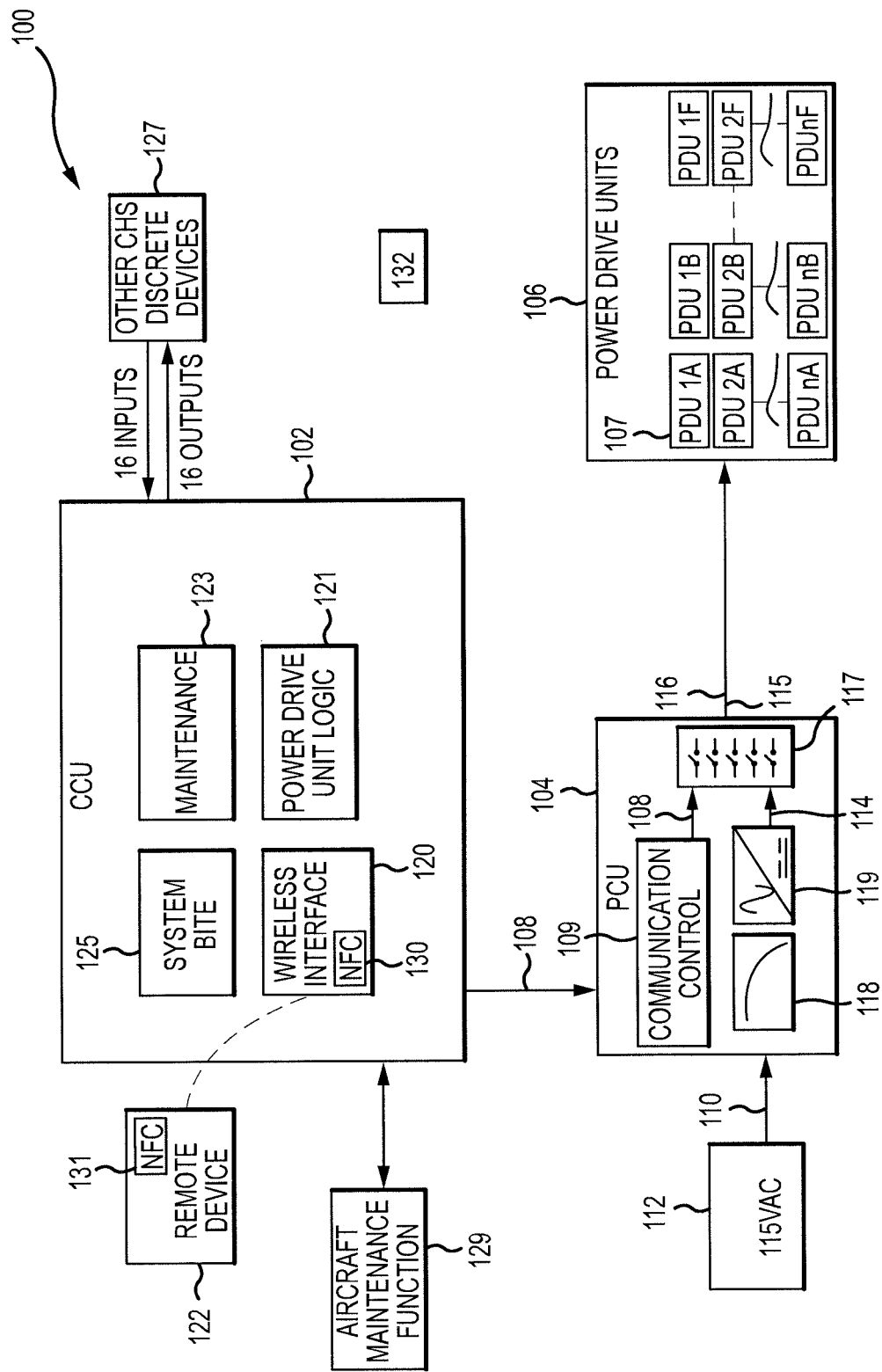
FIG. 1 is a block diagram illustrating an exemplary cargo handling system architecture, in accordance with various embodiments.

According to various embodiments, and with reference to FIG. 1, a cargo handling system 100 may include a cargo control unit (CCU) 102, a power control unit (PCU) 104, and a plurality of power drive units (PDUs) 106 including a PDU 107. Each of the PDUs 106 is designed to transport cargo, individual pieces of which may be referred to as a unit load device (ULD), within a cargo bay (such as the cargo bay 500 of FIG. 5) of an aircraft. The PCU 104 may provide a combination of electrical power and control data to the PDUs 106, and the CCU 102 may provide the control data to the PCU 104.

The CCU 102 may generate control data 108 for controlling the PDUs 106. For example, the CCU may generate the control data 108 based on data received from a remote device 122 to a wireless interface 120, based data from a power drive unit logic function 121, based on data from a maintenance function 123, based on data from a system BITE function 125, based on data from one or more additional cargo handling system discreet device 127, and/or based on data from an aircraft maintenance function 129. The system BITE function 125 may refer to built-in test equipment, which may be characterized as a passive fault management and diagnosis system.

The PCU 104 may receive the control data 108 from the CCU 102. In particular, the PCU 104 may include a communication control function 109 that receives the control data 108 from the CCU 102. The PCU 104 may also receive alternating current (AC) electrical power 110 from a power source 112. The PCU 104 may include one or more rectifier function 118 and one or more filter 119 for converting the AC electrical power 110 into direct current (DC) electrical power 114 and for reducing noise of the DC electrical power 114. The PCU may also be allocated requirements to consume current that conforms to various aircraft standards, thus reducing noise on electrical wiring of a corresponding aircraft.

The PCU 104 may combine the DC electrical power 114 and the control data 108 into a single output signal 116 and may transmit the single output signal 116 to each of the PDUs 106 via a power line 115. In that regard, the power line 115 may function as a power line and as a data bus.

The PCU 104 may further include an internal switch 117 for combining the control data 108 and the DC electrical power 114 and/or for controlling to which of the PDUs 106 the output signal 116 will be transmitted. The internal switch 117 may also protect corresponding wires, for example, by functioning as a circuit-breaker in response to the presence of an electrical fault.

The PDUs 106 may each be capable of transporting cargo within the cargo bay of the aircraft. Conventional PDUs may be paired with a braking roller. The braking roller may be used to resist movement of cargo when a corresponding PDU fails to receive power. This may be especially advantageous to prevent movement of cargo within the cargo bay in response to a floor panel of the cargo bay being angled relative to a ground surface.

Each of the PDUs 106 may be designed to provide the functionality of the braking roller internally. For example, each of the PDUs 106 may include a permanent magnet motor having a power drive function, a first braking function, and a second braking function. The PDU 106 may also include a wheel component and power driving engagement with the permanent magnet motor such that the first braking function includes a static restraint braking function and the second braking function includes a dynamic control braking function. The power drive function corresponds to a function for moving cargo within the cargo bay.

Figure 2:
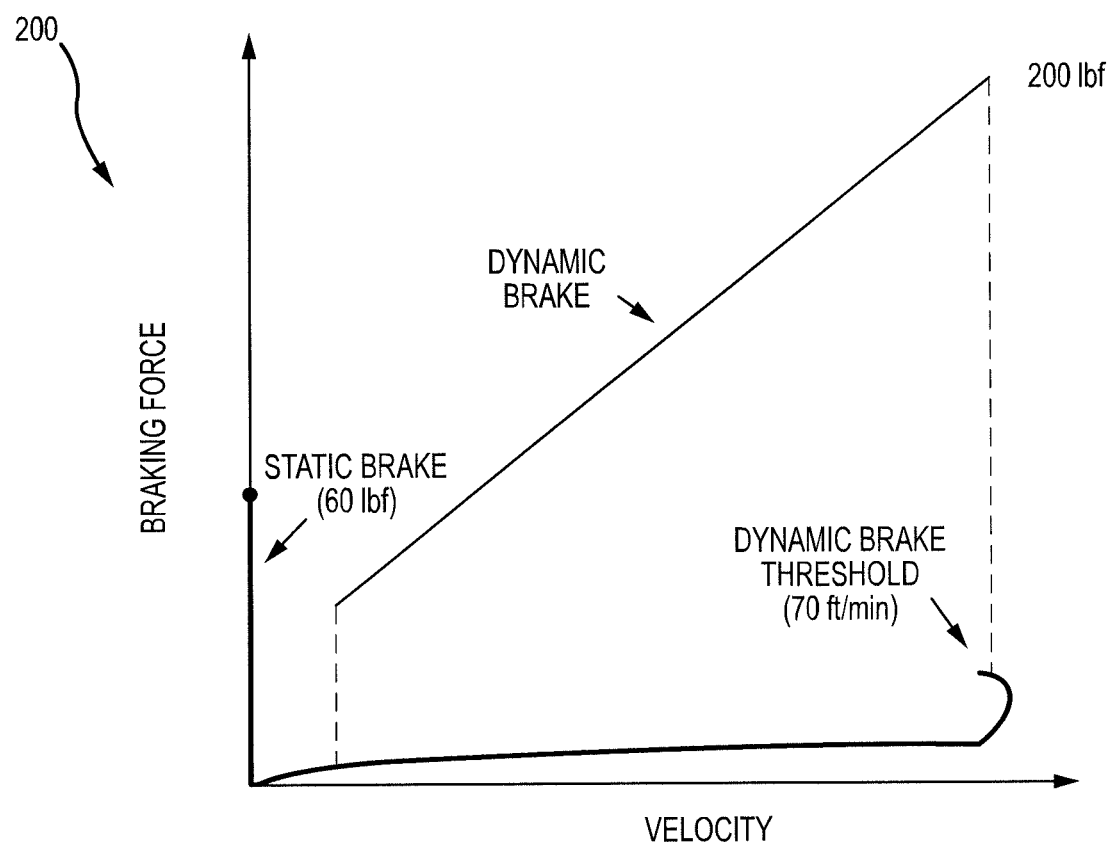
FIG. 2 is a chart illustrating operation of the braking roller functionality that is integrated into a power drive unit, in accordance with various embodiments.

Referring to FIGS. 1 and 2, exemplary operation of the PDU 107 is shown. FIG. 2 is a plot 200 that illustrates braking force of the PDU 107 relative to velocity of cargo. As shown, the PDU 107 is designed to have a cogging torque. In that regard, the PDU 107 is designed to apply a predetermined amount of static braking force in response to a lack of power being provided to the PDU 107. For example, the PDU 107 may be designed to apply between 40 pound force and 80 pound force (between 178 Newtons and 356 Newtons) or about 60 pound force (267 newtons) of braking force in response to being powered down and in response to a lack of movement of the cargo. Where used in this context, about refers to the stated value plus or minus 10 percent of the stated value.

In response to being powered down and the cargo moving relative to the cargo bay at a predetermined speed, the dynamic braking function may be activated within the PDU 107, which may result in a greater amount of torque than the static brake cogging torque. As shown, the dynamic braking function may result in 200 pound force (890 newtons) of braking force in response to being powered down and in response to the cargo moving relative to the cargo bay at 70 feet per minute (21 meters per minute).

Returning reference to FIG. 1, the output signal 116 having the DC electrical power 114 and the control data 108 may be transmitted on a single power line 115 or combination of power lines. The control data 108 may be provided via a periodic signal having a frequency. In that regard, the control data 108 and the DC electrical power 114 may be simultaneously transmitted as the output signal 116 and may be separated upon receipt at a corresponding PDU 106.

For example, a low pass filter may be used at a respective PDU 106 to remove the control data 108 from the output signal 116. After filtering the control data 108 from the output signal 116, the DC electrical power 114 alone will remain. Likewise, a high pass filter may be used at the respective PDU 106 to remove the DC electrical power 114 from the output signal 116. After filtering the DC electrical power 114 from the output signal 116, the control data 108 alone will remain. The separated DC electrical power 114 may be used to power the PDU 106, and the separated control data 108 may be used to control the PDU 106.

Figure 3:
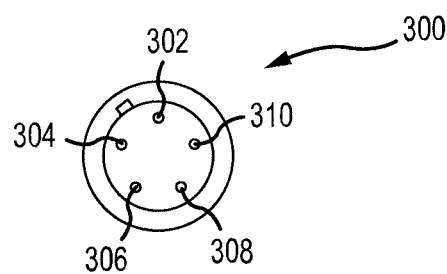
FIG. 3 is a cross-sectional view of a connector used to transmit a combination of a DC power signal and control data to a power drive unit, in accordance with various embodiments.

Referring now to FIGS. 1 and 3, the power line 115 may include a connector 300. The connector 300 may connect the PCU 104 to one or more of the PDUs 106. The connector 300 may include a plurality of contacts including a first contact 302, a second contact 304, a third contact 306, a fourth contact 308, and a fifth contact 310. The first contact 302 is designed to transmit the output signal 116 having the DC electrical power 114 and the control data 108. The second contact 304 may be connected to a DC return and the control data 108. The third contact 306, fourth contact 308, and fifth contact 310 may be coupled to a ground structure 132, such as a chassis or an aircraft frame.

A cable or wire may transport the signals from the connector 300. The cable or wire that provides the DC electrical power 114 and the control data 108 may include two conductors contained within a shield.

Figure 4:
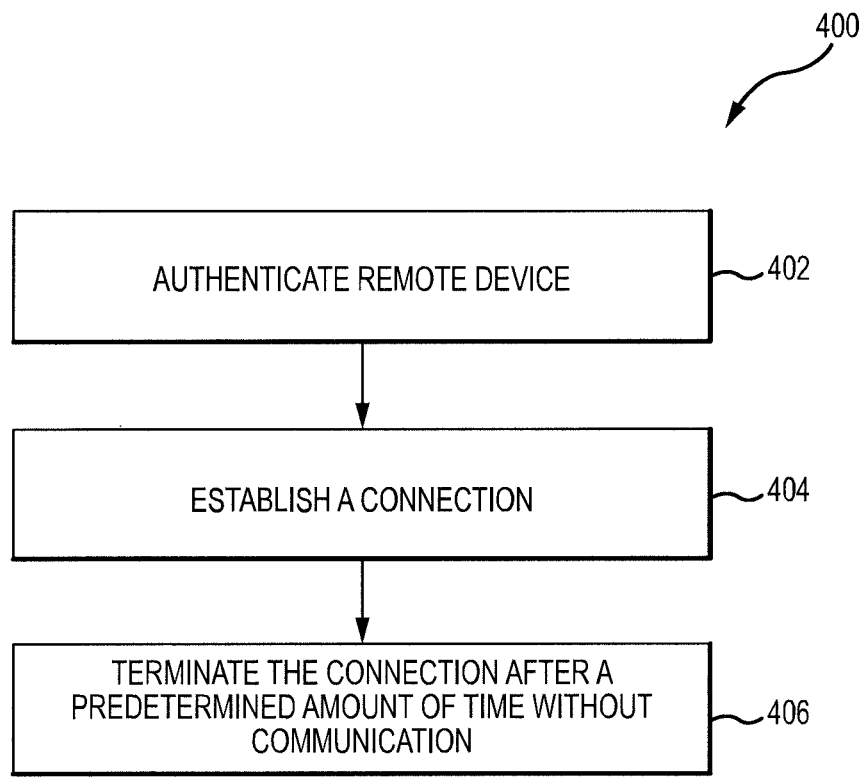
FIG. 4 is a flowchart illustrating a method for establishing a connection between a cargo control unit and a remote device, in accordance with various embodiments.

Returning reference to FIG. 1, the wireless interface 120 may be designed to authenticate the remote device 122 prior to establishing a connection with the remote device 122. In that regard and with reference to FIGS. 1 and 4, a method 400 illustrates a communication protocol between the wireless interface 120 and the remote device 122.

In block 402, the wireless interface 120 may authenticate the remote device 122. In various embodiments, the authentication may include verifying that the remote device is located within a predetermined distance of the CCU 102. For example, the authentication may include determining a current location of the remote device 122. For example, the remote device 122 may transmit data to the wireless interface 120 indicating a current location of the remote device 122. For example, the remote device 122 may determine the current location based on global positioning system (GPS) data, inertial measurement data, or any other method of determining location data that is known in the art.

With reference to FIG. 1, as another example, the wireless interface 120 may include a near field communication (NFC) reader or transmitter 130, and the remote device 122 may include a NFC transmitter or reader 131. In order to authenticate the remote device 122, a user may position the NFC transmitter or reader 131 within a predetermined distance of the NFC reader or transmitter 130 of the wireless interface 120. In response to establishment of a NFC connection between the remote device 122 and the wireless interface 120, the remote device 122 may be authenticated.

After the authentication step in block 402, a connection may be established between the remote device 122 and the wireless interface 120 in block 404. The connection may be a wireless connection such as an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular signal, an infrared signal, an optical signal, or any other signal capable of transmitting information wirelessly.

In order to reduce the likelihood of unwanted access to the CCU 102, the wireless interface 120 may terminate the connection with the remote device 122 after a predetermined amount of time has expired without communication between the remote device 122 and the wireless interface 120. For example, the connection may be terminated after 30 seconds, 1 minute, 5 minutes, or the like without receiving a communication from the remote device 122. In order to reestablish the connection, the remote device 122 should again be authenticated in block 402.

Figure 5:
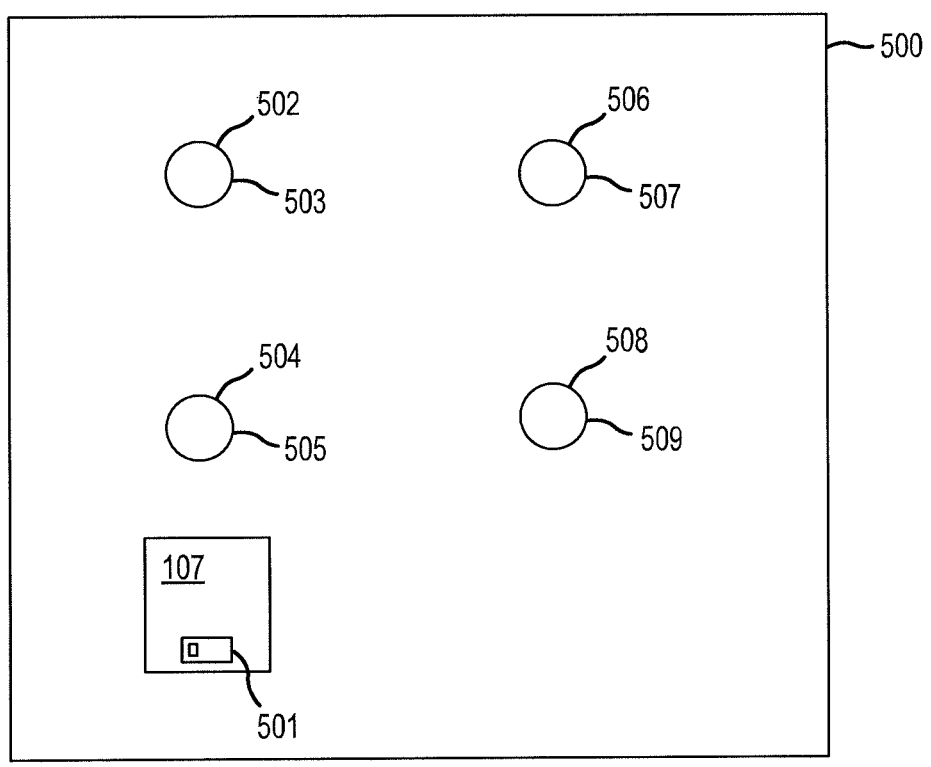
FIG. 5 is a block diagram illustrating an exemplary layout of a cargo bay of an aircraft, in accordance with various embodiments.

Referring now to FIGS. 1 and 5, the PDU 107 may be located in a cargo bay 500. The PDU 107 may be located in any of a plurality of locations including a first location 502, a second location 504, a third location 506, and a fourth location 508. Each of the locations 502, 504, 506, 508 may include a radio frequency identification (RFID) tag 503, 505, 507, 509, respectively. For example, the RFID tag 503, 505, 507, 509 may be embedded within a floor panel of the cargo bay 500.

The PDU 107 may include a RFID reader 501. In that regard, as the PDU 107 is powered-on, the RFID reader 501 may detect data corresponding to the nearby RFID tag 503, 505, 507, 509. The PDU 107 may utilize the data within the corresponding RFID tag 503, 505, 507, 509 to determine its current location relative to the cargo bay 500. In various embodiments, each RFID tag 503, 505, 507, 509 may store and transmit data corresponding to its location. For example, if the PDU 107 is located at the first location 502, the RFID reader 501 may receive data from the RFID tag 503. The PDU 107 may analyze the data received from the RFID tag 503 to determine that the PDU 107 is located at the first location 502. The PDU 107 may utilize the data corresponding to its determined location to discriminate the correct command signal from the communication bus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo handling system for use in a cargo bay having a plurality of radio frequency identification (RFID) tags, the cargo handling system comprising:
    a power drive unit (PDU) configured to transport cargo within an aircraft and having a RFID reader such that the PDU is configured to determine a location of the PDU by reading a RFID tag of the plurality of RFID tags;
    a cargo control unit (CCU) configured to output control data for controlling operation of the PDU; and
    a power control unit (PCU) coupled to the PDU and the CCU and configured to:
        receive alternating current (AC) electrical power from a power source,
        convert the AC electrical power into direct current (DC) electrical power,
        receive the control data from the CCU,
        generate an output signal including the DC electrical power and the control data, and
        transmit the output signal to the PDU,
    wherein the PDU is further configured to discriminate a correct command signal from the output signal based on the location of the PDU that was determined based on the RFID tag.

2. The cargo handling system of claim 1 wherein the PDU includes multiple PDUs each configured to receive one of a plurality of output signals from the PCU.

3. The cargo handling system of claim 1 wherein the PDU has a cogging torque and is configured to resist relative movement of cargo when the PDU fails to receive the DC electrical power.

4. The cargo handling system of claim 1 wherein the output signal includes the DC electrical power and the control data on a same power line.

5. The cargo handling system of claim 4 further comprising a connector coupled to the PCU and the PDU and having a first contact configured to transport the output signal, a second contact coupled to a DC return, and at least a third contact coupled to a ground structure.

6. The cargo handling system of claim 4 wherein the same power line functions as a data bus.

7. The cargo handling system of claim 1 wherein the CCU includes a wireless interface configured to establish a connection with a remote device only after authentication of the remote device that includes verifying that the remote device is located within a predetermined distance of the CCU.

8. The cargo handling system of claim 7 wherein the CCU is further configured to verify that the remote device is located within the predetermined distance of the CCU by at least one of establishing a near field communication (NFC) link with the remote device or receiving a current location of the remote device from the remote device.

9. The cargo handling system of claim 7 wherein the CCU is further configured to terminate the connection with the remote device after expiration of a predetermined amount of time without receiving a communication signal from the remote device.

10. A cargo handling system for use in a cargo bay having a plurality of radio frequency identification (RFID) tags, the cargo handling system comprising:
    a plurality of power drive units (PDUs) each configured to transport cargo within an aircraft, having a cogging torque such that each of the plurality of PDUs resist relative movement of cargo when a respective PDU fails to receive power, and having a RFID reader such that the PDU is configured to determine a location of the PDU by reading a RFID tag of the plurality of RFID tags;

a cargo control unit (CCU) configured to output control data for controlling operation of each of the plurality of PDUs; and a power control unit (PCU) coupled to the plurality of PDUs and the CCU and configured to:
receive alternating current (AC) electrical power from a power source,
convert the AC electrical power into direct current (DC) electrical power,
receive the control data from the CCU,
generate an output signal including the DC electrical power and the control data, and
transmit the output signal to each of the plurality of PDUs,
wherein at least one of the plurality of PDUs is further configured to discriminate a correct command signal from the output signal based on the location of the at least one PDU that was determined based on the RFID tag.

11. The cargo handling system of claim 10 further comprising a connector coupled to the PCU and at least one of the plurality of PDUs and having a first contact configured to transport the output signal, a second contact coupled to a DC return, and at least a third contact coupled to a ground structure.

12. The cargo handling system of claim 10 wherein the PCU is further configured to filter the DC electrical power to reduce noise of the DC electrical power.

13. The cargo handling system of claim 10 wherein the CCU includes a wireless interface configured to establish a connection with a remote device only after authentication of the remote device that includes verifying that the remote device is located within a predetermined distance of the CCU.

14. The cargo handling system of claim 13 wherein the CCU is further configured to verify that the remote device is located within the predetermined distance of the CCU by at least one of establishing a near field communication (NFC) link with the remote device or receiving a current location of the remote device from the remote device.

15. The cargo handling system of claim 13 wherein the CCU is further configured to terminate the connection with the remote device after expiration of a predetermined amount of time without receiving a communication signal from the remote device.

16. A cargo handling system for use in a cargo bay having a plurality of radio frequency identification (RFID) tags, the cargo handling system comprising:
a power drive unit (PDU) configured to transport cargo within an aircraft, having a cogging torque such that the PDU resists relative movement of cargo when the PDU fails to receive power, and having a RFID reader such that the PDU is configured to determine a location of the PDU by reading a RFID tag of the plurality of RFID tags;
a cargo control unit (CCU) that includes a wireless interface and is configured to output control data for controlling operation of the PDU and to establish a connection with a remote device only after authentication of the remote device that includes verifying that the remote device is located within a predetermined distance of the CCU; and
a power control unit (PCU) coupled to the PDU and the CCU and configured to:
receive alternating current (AC) electrical power from a power source,
convert the AC electrical power into direct current (DC) electrical power,
receive the control data from the CCU,
generate an output signal including the DC electrical power and the control data, and
transmit the output signal to the PDU,
wherein the PDU is further configured to discriminate a correct command signal from the output signal based on the location of the PDU that was determined based on the RFID tag.

17. The cargo handling system of claim 16 wherein the CCU is further configured to verify that the remote device is located within the predetermined distance of the CCU by at least one of establishing a near field communication (NFC) link with the remote device or receiving a current location of the remote device from the remote device.

18. The cargo handling system of claim 16 further comprising a connector coupled to the PCU and the PDU and having a first contact configured to transport the output signal, a second contact coupled to a DC return, and at least a third contact coupled to a ground structure.

* * * * *